(12) United States Patent
Zaloom

(10) Patent No.: US 10,305,528 B2
(45) Date of Patent: May 28, 2019

(54) INCONSPICUOUS COUPLING SYSTEM FOR PROPPING SMART PHONES AND TABLET COMPUTERS TO VARIOUS ANGLES AND ORIENTATIONS

(71) Applicant: Joseph Anthony Zaloom, Falls Church, VA (US)

(72) Inventor: Joseph Anthony Zaloom, Falls Church, VA (US)

(73) Assignee: Joseph A. Zaloom, Falls Church, VA (US)

( * ) Notice: Subject to any disclaimer, the term of this patent is extended or adjusted under 35 U.S.C. 154(b) by 0 days.

(21) Appl. No.: 16/136,247

(22) Filed: Sep. 19, 2018

(65) Prior Publication Data
US 2019/0044562 A1    Feb. 7, 2019

Related U.S. Application Data

(63) Continuation of application No. 15/229,644, filed on Aug. 5, 2016, now Pat. No. 10,135,480.

(60) Provisional application No. 62/263,434, filed on Dec. 4, 2015.

(51) Int. Cl.
*F16M 11/24* (2006.01)
*H04B 1/3877* (2015.01)
*H04B 1/3888* (2015.01)

(52) U.S. Cl.
CPC .......... *H04B 1/3877* (2013.01); *F16M 11/24* (2013.01); *H04B 1/3888* (2013.01)

(58) Field of Classification Search
None
See application file for complete search history.

(56) References Cited

U.S. PATENT DOCUMENTS

| | | | | |
|---|---|---|---|---|
| 5,067,573 A | * | 11/1991 | Uchida | G06F 1/1626 345/173 |
| 5,530,208 A | * | 6/1996 | Moriconi | G06F 1/1613 178/19.01 |
| 5,703,626 A | * | 12/1997 | Itoh | G06F 1/1626 178/19.01 |
| 6,285,758 B1 | | 9/2001 | Lu | |
| 6,356,443 B2 | * | 3/2002 | Jenks | G06F 1/1626 343/720 |
| 6,681,333 B1 | * | 1/2004 | Cho | G06F 1/1626 345/179 |
| 6,819,557 B2 | * | 11/2004 | Lilenfeld | G06F 3/03545 345/179 |
| 6,924,791 B1 | * | 8/2005 | Nicolas | G06F 1/1626 178/18.01 |
| 8,194,055 B2 | * | 6/2012 | Liu | G06F 1/1656 345/179 |
| D664,528 S | | 7/2012 | Chen | |

(Continued)

OTHER PUBLICATIONS

"Spigen's Universal Metal Kickstand adds a sleek built-in stand to iPhone for $10", 9to5 Mac, Aug. 8, 2016, 2 pages.

(Continued)

*Primary Examiner* — Monica E Millner

(57) ABSTRACT

An inconspicuous system of cavities, sockets, or notches for coupling a support element such as a stylus, an independent arm, or plate, to smart phones and tablet computers at various angles and orientations in order to position these devices to various angles and orientations with respect to a resting surface or base.

3 Claims, 20 Drawing Sheets

(56) References Cited

U.S. PATENT DOCUMENTS

| | | | |
|---|---|---|---|
| 8,255,015 B2* | 8/2012 | Wang | G06F 1/1626 455/575.1 |
| 8,299,933 B2* | 10/2012 | Deng | G06F 1/1626 340/636.1 |
| 8,339,123 B2* | 12/2012 | Chen | G01C 17/30 324/202 |
| 8,382,059 B2 | 2/2013 | Le Gette | |
| D698,543 S | 2/2014 | Le Gette | |
| 8,736,585 B2* | 5/2014 | Omata | G06F 1/1626 345/173 |
| 8,960,634 B2 | 2/2015 | Le Gette | |
| 9,124,681 B2* | 9/2015 | Park | H04M 1/21 |
| 9,144,279 B2* | 9/2015 | Venida | A45C 11/34 |
| 9,267,638 B2 | 2/2016 | Le Gette | |
| D771,615 S | 11/2016 | Pignotti | |
| 2003/0210223 A1* | 11/2003 | Park | G06F 1/1626 345/156 |
| 2006/0044288 A1* | 3/2006 | Nakamura | G06F 1/1626 345/179 |
| 2007/0117430 A1* | 5/2007 | Lin | G06F 1/1626 439/164 |
| 2009/0128521 A1* | 5/2009 | Chen | G06F 1/1626 345/179 |
| 2010/0007251 A1* | 1/2010 | Hsu | G06F 1/1601 312/223.1 |
| 2010/0142175 A1* | 6/2010 | Cheng | H04M 1/04 361/825 |
| 2012/0252543 A1 | 10/2012 | Cho | |
| 2013/0342976 A1* | 12/2013 | Chung | H05K 5/0234 361/679.01 |
| 2014/0357328 A1 | 12/2014 | Aharon et al. | |

OTHER PUBLICATIONS

"All Phones Should Come With a Kickstand, But This Universal Spigen One Will Do"; www.reviewgeek.com; Eric Ravenscraft; Feb. 1, 2018, 3 pages.

"ZeroChroma VarioProtect for iPhone 6 and iPhone 6 Plus", iLounge, Phil Dzikiy, Jan. 12, 2015, 4 pages.

* cited by examiner

INCONSPICUOUS COUPLING SYSTEM FOR PROPPING SMART PHONES AND TABLET COMPUTERS TO VARIOUS ANGLES AND ORIENTATIONS

RELATED APPLICATION

This application is a continuation of U.S. patent application Ser. No. 15/229,644 filed on Aug. 5, 2016, which claims the benefit of U.S. Provisional Patent Application 62/263,434, filed Dec. 4, 2015, both of which applications are incorporated by reference in their entirety.

TECHNICAL FIELD

The technology herein relates to mechanisms and systems for positioning smart phones and tablet computers at various angles and orientations with respect to a resting surface or base.

BACKGROUND OF THE INVENTION

Since the introduction of the Apple iPhone in June 2007, the number of computing devices known as smart phones and tablet computers has vastly increased. These devices typically consist of a touch screen that fronts a highly sophisticated, versatile, thin, and lightweight computer that among other things, serves as a point-and-shoot camera, a video camera, a face-to-face wireless communications device, a voice recorder, an electronic notepad, and even an electronic canvas. So much so, that Samsung offers a line of high-end smart phones with an imbedded stylus under the "Galaxy Note" tradename and Apple offers a highly sophisticated optional stylus under the "iPad Pro" tradename. These smart phones and tablet computers, especially the Samsung Galaxy Note line of smart phones, with the embedded stylus, may benefit greatly from using the stylus as a support element to prop these devices to various angles and orientations with respect to a fixed surface or base, in a manner that is similar to how a tripod can be used to prop a flat panel to various angles and orientations with respect to a base. Therefore, a need exists for a simple and inconspicuous mechanism that can securely couple an electronic stylus to mobile personal computing devices to enable these devices to be propped up to various angles and orientations with respect to a resting surface or base.

SUMMARY OF THE INVENTION

I invented and disclose herein a system comprising a plurality of cavities, sockets, or notches to enable a support element, such as a stylus, an independent arm, or plate, to prop and position an electronic information display and input device to various angles and orientations with respect to a resting surface or base. The system comprising:

a back plate of an electronic information display and input device; or a protective cover of an electronic information display and input device; or a panel that can be adhered to the back plate of an electronic information display and input device;

wherein the back plate, protective cover, or panel, comprises at least two cavities, sockets, or notches, each cavity, socket, or notch comprising either straight, curved, or slanted walls, or any combination thereof; with each cavity, socket, or notch configured to receive, fully or partially, one end of a matching support element; such as a stylus, an independent arm, or plate at a specific angle and orientation with respect to the back plate, protective cover, or panel; and wherein the support element is used to prop the electronic information display and input device to discrete angles and orientations with respect to a resting surface or base by manually keying one end of the support element into a matching cavity, socket, or notch located in the back plate, protective cover, or panel, and placing the other end of the support element on a resting surface or base.

In order to strengthen the connection between cavity, socket, or notch and matching support element, at least one end of the support element may be magnetized and the matching cavities, sockets, or notches on the back plate, protective cover, or panel, may comprise, or may be layered by, a metallic substance.

Alternatively, at least one end of the support element may be metallic and the matching cavities, sockets, or notches, on the back plate, protective cover, or panel may comprise, or may be layered by, a magnetic substance.

DETAILED DESCRIPTION

While the illustrations described below refer to an all-enveloping protective cover for a personal information display and input device, the concept of this invention may also be applied directly to a personal information display and input device without the need for a protective cover for its implementation.

FIG. 1 to FIG. 5 are used to illustrate the concept of the invention as it relates to propping a personal information display and input device to various angles and orientations using a stylus.

Figure 1:
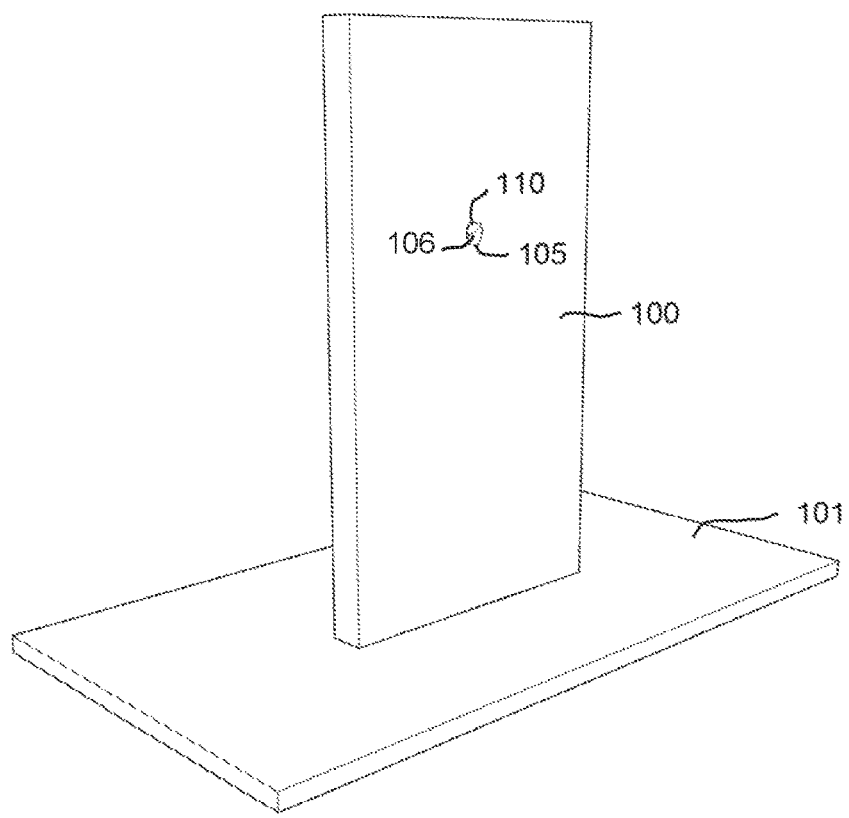
FIGS. 1 to 5 illustrate the concept of the invention as it relates to propping a personal information display and input device to various angles and orientations using a stylus.

FIG. 1 illustrates a vertical slab 100 resting on flat surface 101 with a circular cavity 105 having a curved and slanted wall 106 and a straight and slanted wall 110 located in the top tier of slab 100.

Figure 2:
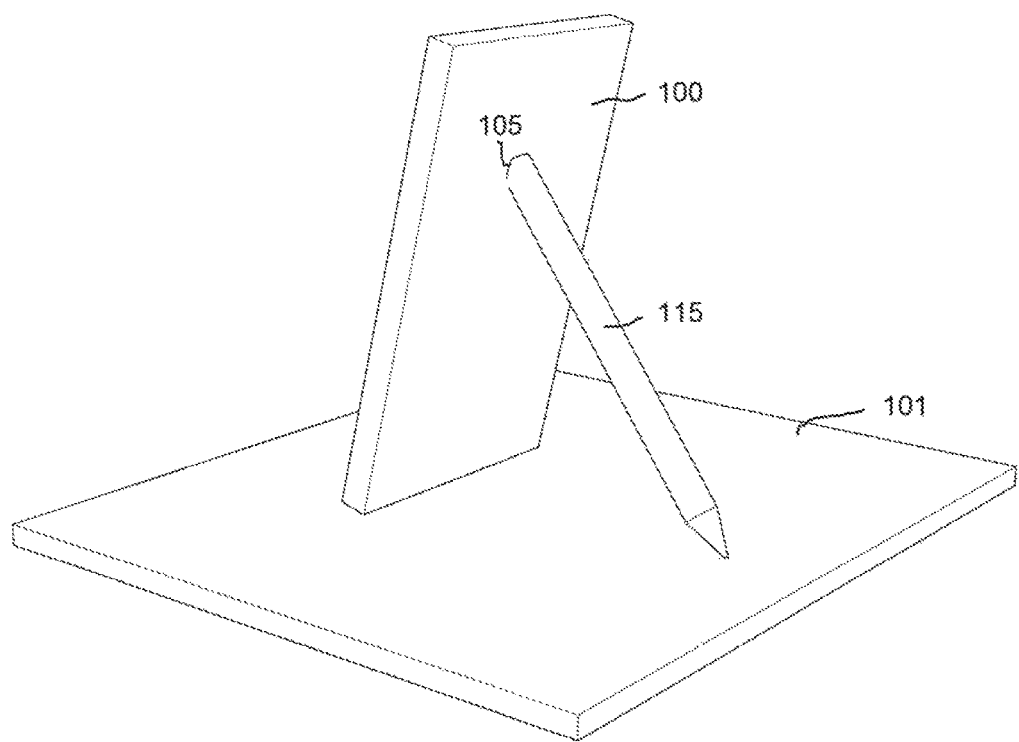

FIG. 2 illustrates how a cylindrically shaped stylus 115 may support a slab 100 at an incline by partially resting in slanted cylindrical cavity 105 of slab 100. The cylindrically shaped stylus 115 may be made to strongly latch into the slanted cylindrical cavity 105 of slab 100 by attaching magnetically to the cavity if the cavity is made of a metallic material and the end of the cylindrically shaped stylus 115 is covered with a magnetic surface or substance, or vice versa.

Figure 3:
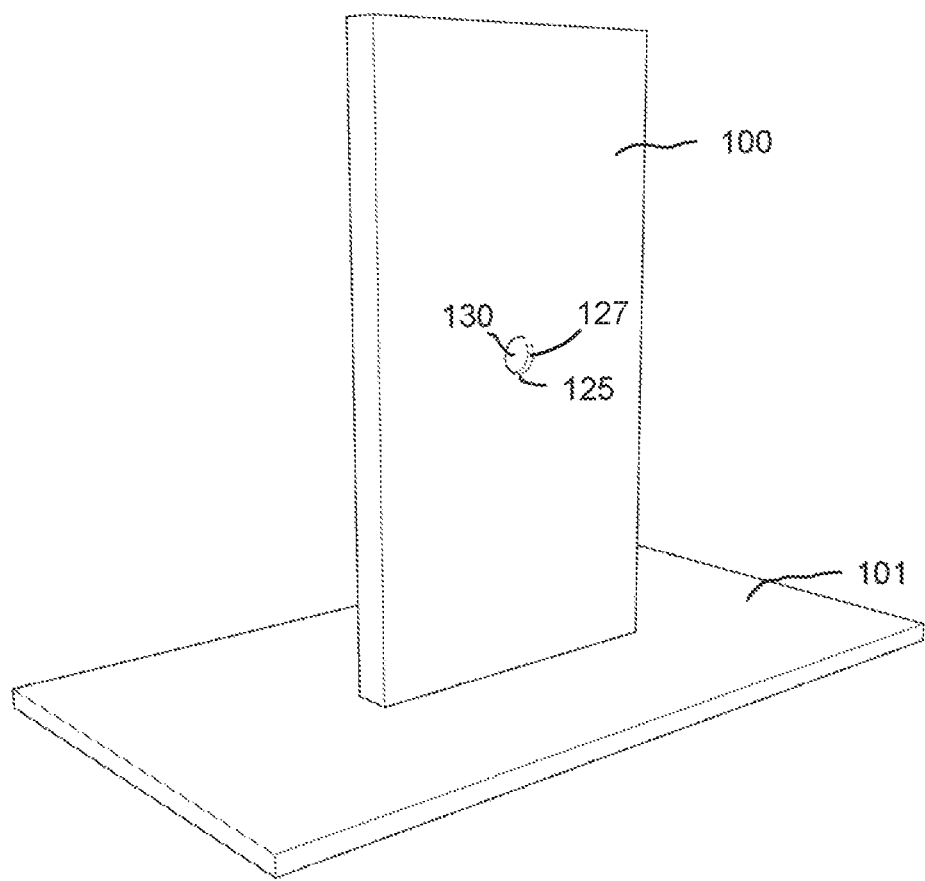

FIG. 3. Illustrates a vertical slab 100 resting on a flat surface 101 with a circular cavity 125 having a curved side wall 127 and a straight back wall 130 located at the center of slab 100.

Figure 4:
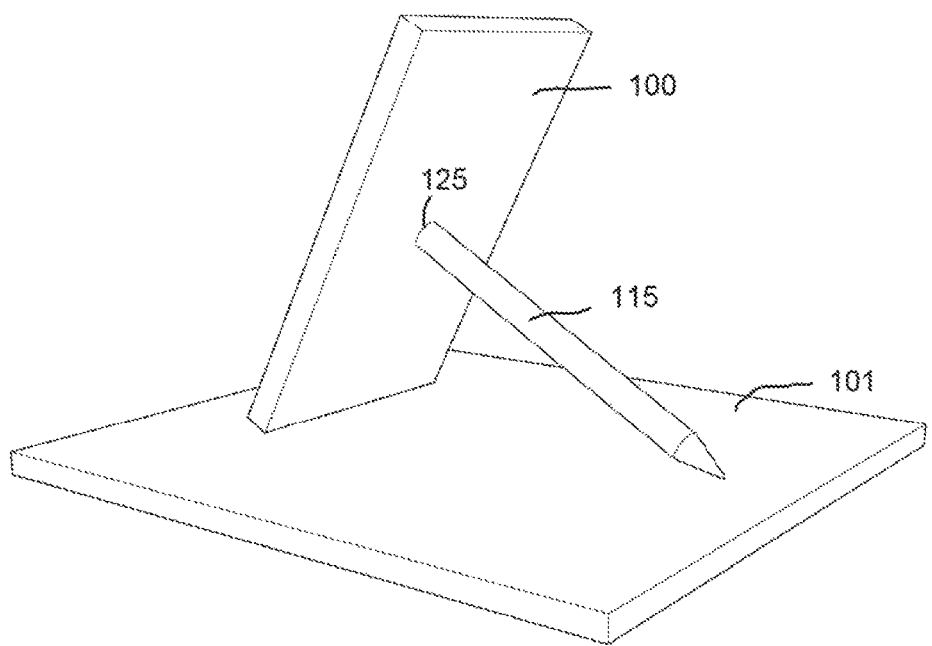

FIG. 4 illustrates how a cylindrically shaped stylus 115 may support a slab 100 at an alternative inclined position by fully inserting into straight cavity 125 of slab 100. The cylindrically shaped stylus 115 may be made to strongly latch into cavity 125 of slab 100 by attaching magnetically to the cavity if the cavity is made of a metallic material and the end of the cylindrically shaped stylus 115 is covered with a magnetic surface or substance, or vice versa.

Figure 5:
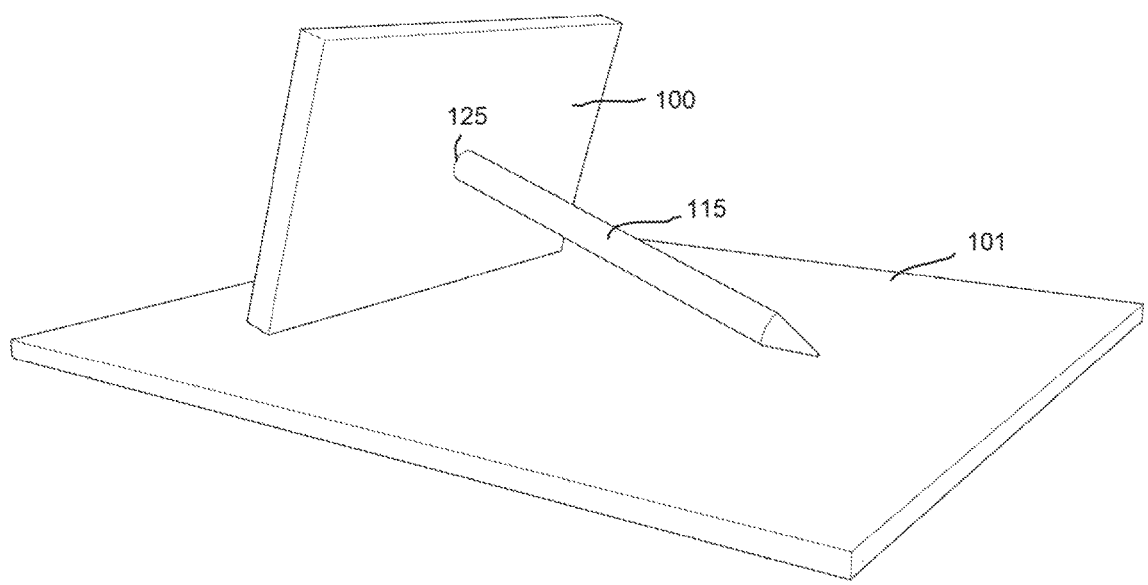

FIG. 5 illustrates how vertical slab 100 may be made to rest on flat surface 101 in an alternative, landscape orientation, simply by rotating slab 100 around the axis of cylindrically shaped stylus 115.

Figure 6:
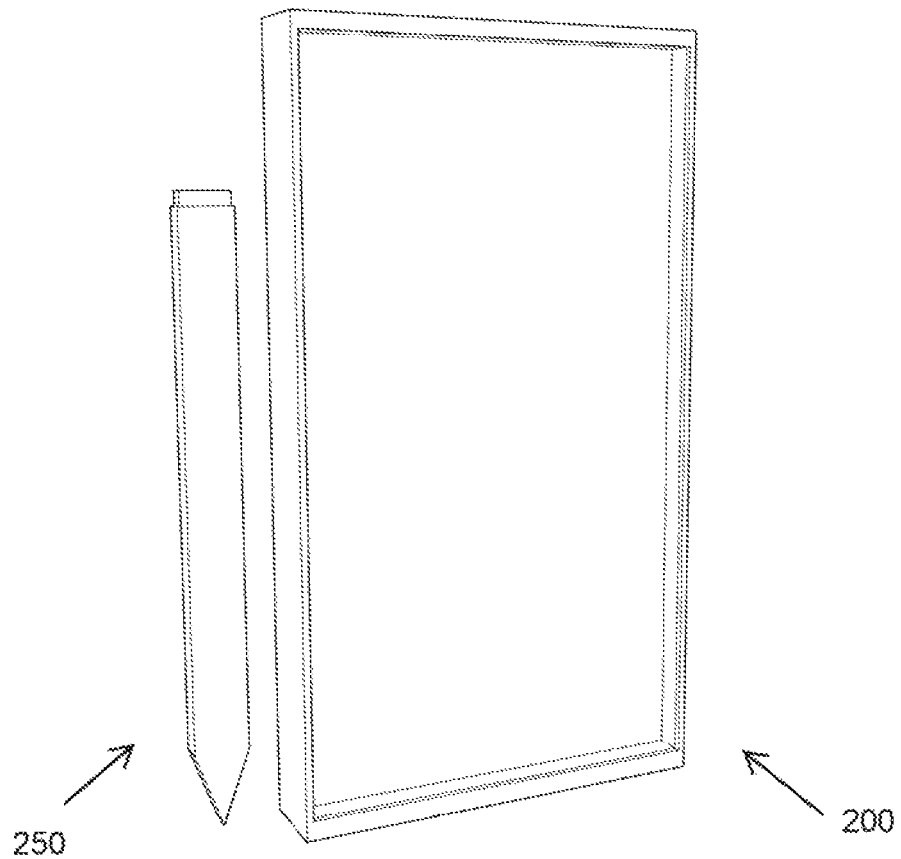
FIG. 6 illustrates a front view of an embodiment of a back cover for a personal information display and input device, or a smart phone, with an associated flat stylus.

FIG. 6 illustrates a 3D front view of a non-limiting embodiment of an enveloping protective cover for a personal information display and input device 200 and an associated flat stylus 250.

Figure 7:
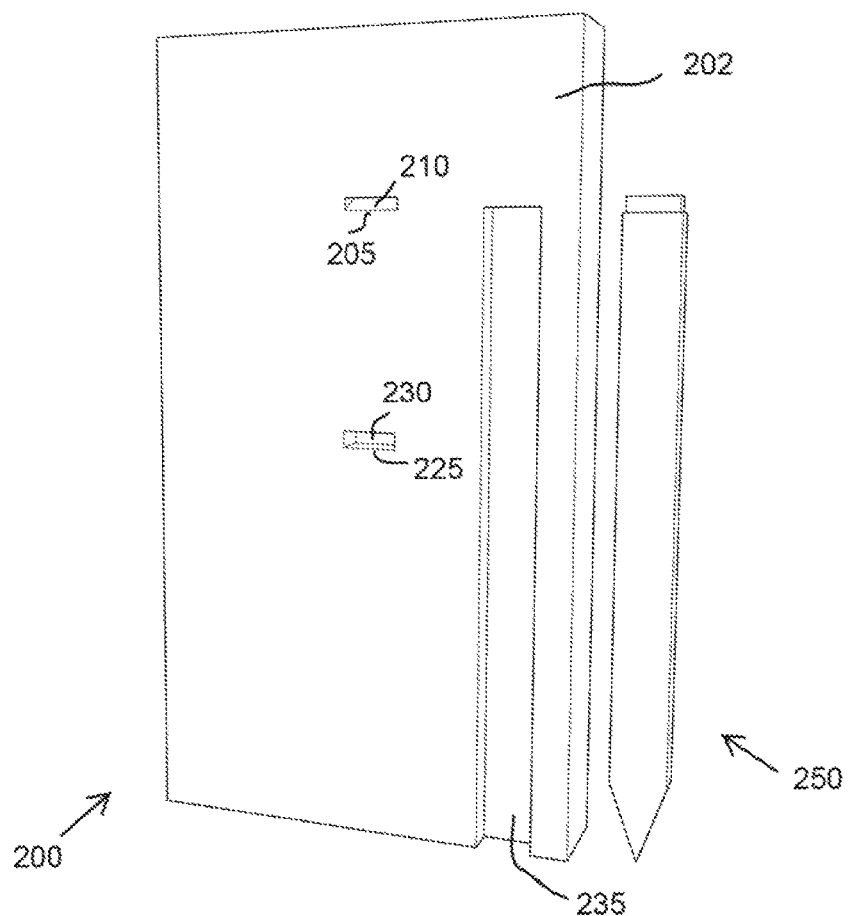
FIG. 7 illustrates a back view of a non-limiting embodiment of a back cover for a personal information display and input device and associated stylus, with cavities cut on the back surface of the cover; cavities which are shaped to receive an end of a flat stylus at varying angles.

FIG. 7 illustrates a 3D back view of a non-limiting embodiment of an enveloping protective cover for a personal information display and input device 200, with the back side of its back panel 202 exposed, along with an associated flat stylus 250. The back side of the back panel 202 includes cavity 205 with slanted walls 210 located in the top tier of protective cover 200 and a second cavity 225 with straight walls 230 located in the middle of protective cover 200. The back panel 202 of the protective cover includes an open recession 235 on the right side of the cover of the personal information display and input device 200 for receiving and stowing a flat stylus 250 into protective cover 200 in the flush position.

Figure 8:
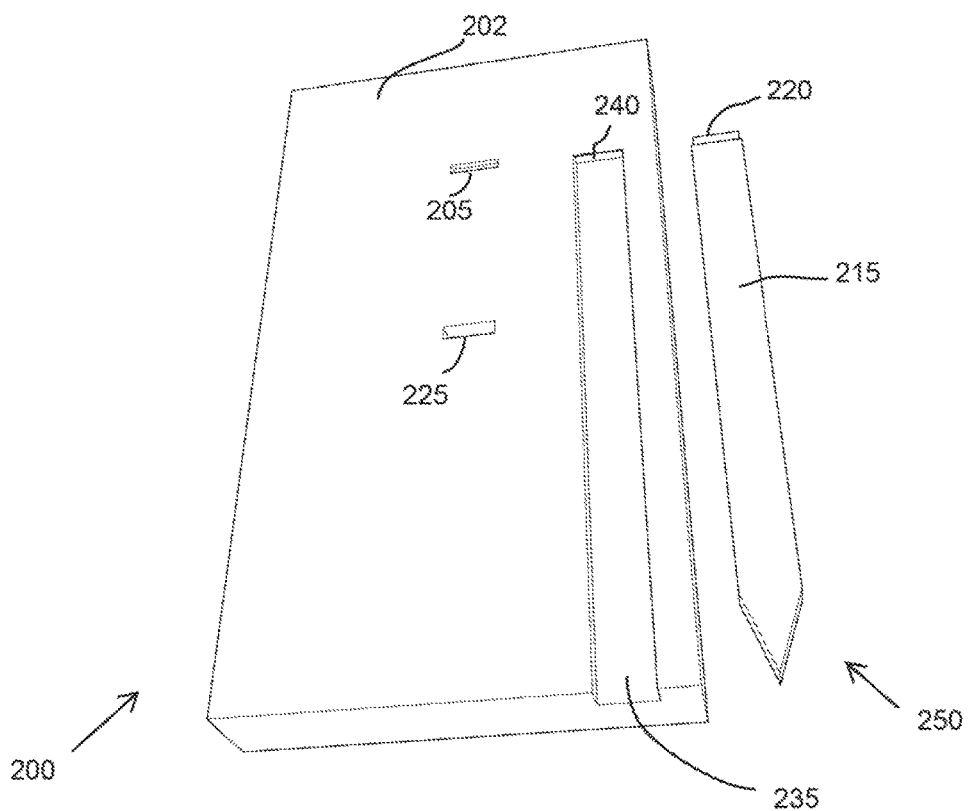
FIG. 8 illustrates a perspective back view of a non-limiting embodiment of a back cover for a personal information display and input device and associated stylus, illustrating how the stylus can be secured into the back surface of the back cover of the personal information display and input device enclosure.

FIG. 8 illustrates a perspective back view of a non-limiting embodiment of an enveloping protective cover for a personal information display and input device 200 with the back side of its back panel 202 exposed from a perspective that shows cavity 240 at the far end of recession 235 which is designed to snugly receive the offset top 220 of flat stylus 250 while keeping the main shaft 215 of flat stylus 250 exposed while being stowed in recession 235 in the back panel 202 of the protective cover of personal information display and input device 200. The offset top 220 of flat stylus 250 may be made to strongly latch into cavity 240 at the far end of recession 235 if the cavity 240 is made of a metallic material and the offset top 220 of stylus 250 is covered with a magnetic surface or substance, or vice versa.

Figure 9:
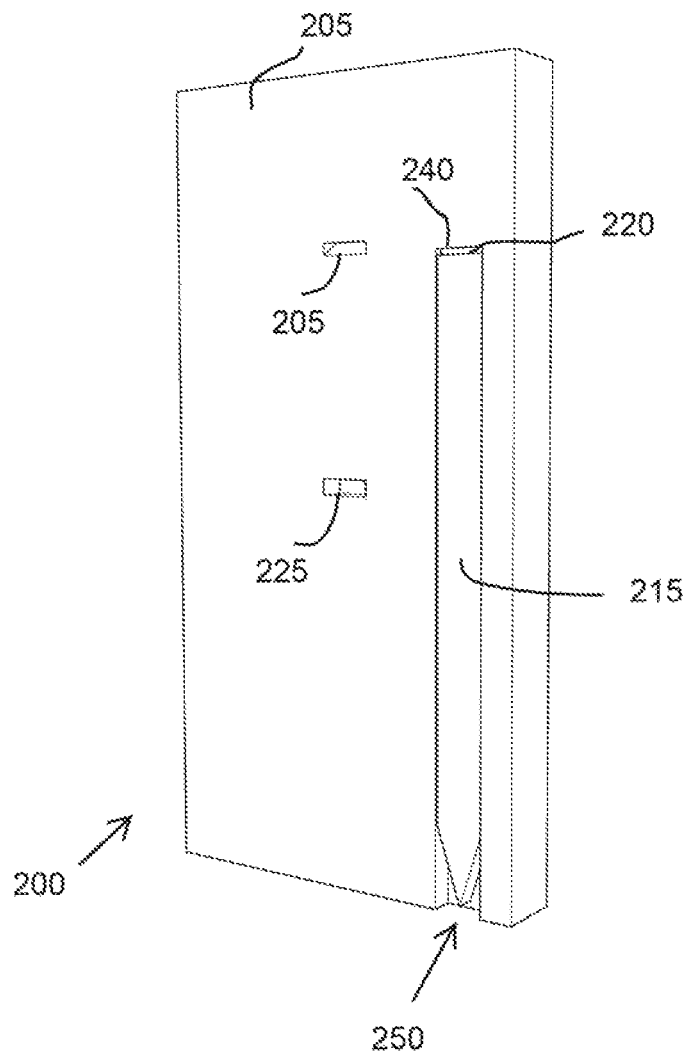
FIG. 9 illustrates a perspective back view of a non-limiting embodiment of a back cover for a personal information display and input device and associated stylus with the stylus stowed in the back surface of the personal information display and input device enclosure.

FIG. 9 illustrates a perspective side view of a non-limiting embodiment of flat stylus 250 snugly stowed in the back surface of the protective cover of personal information display and input device 200.

Figure 10:
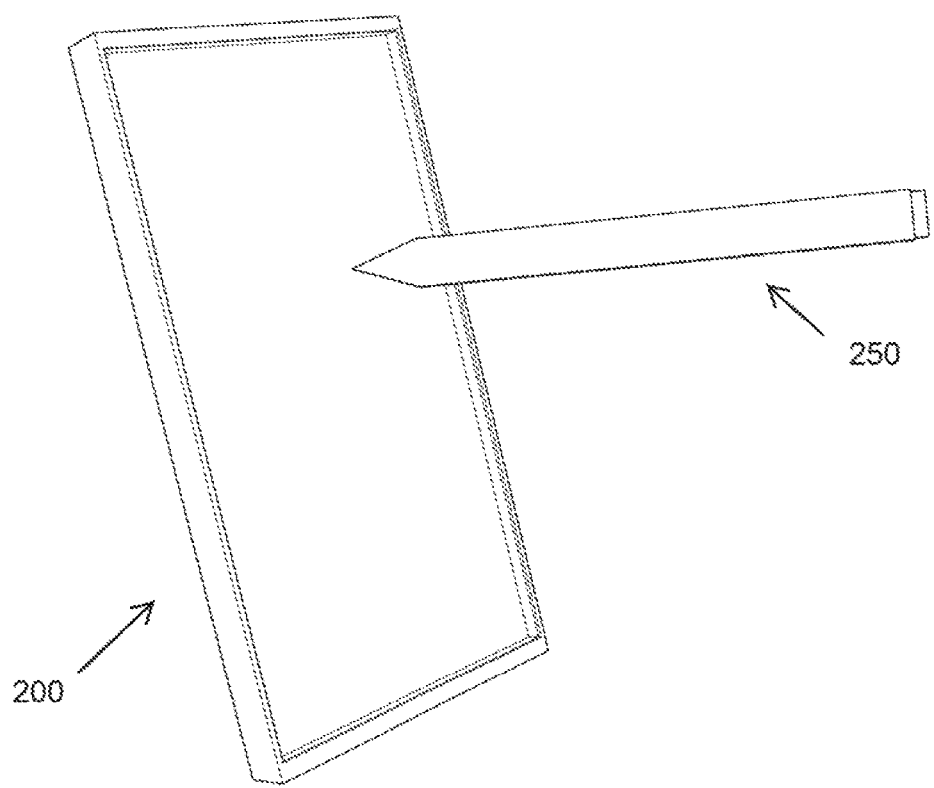
FIG. 10 illustrates a perspective front view of a stylus as it would be positioned for writing on the surface of a personal information display and input device.

FIG. 10 illustrates a perspective front view of the flat stylus 250 as it would be positioned for writing on the surface of a personal information display and input device 200.

Figure 11:
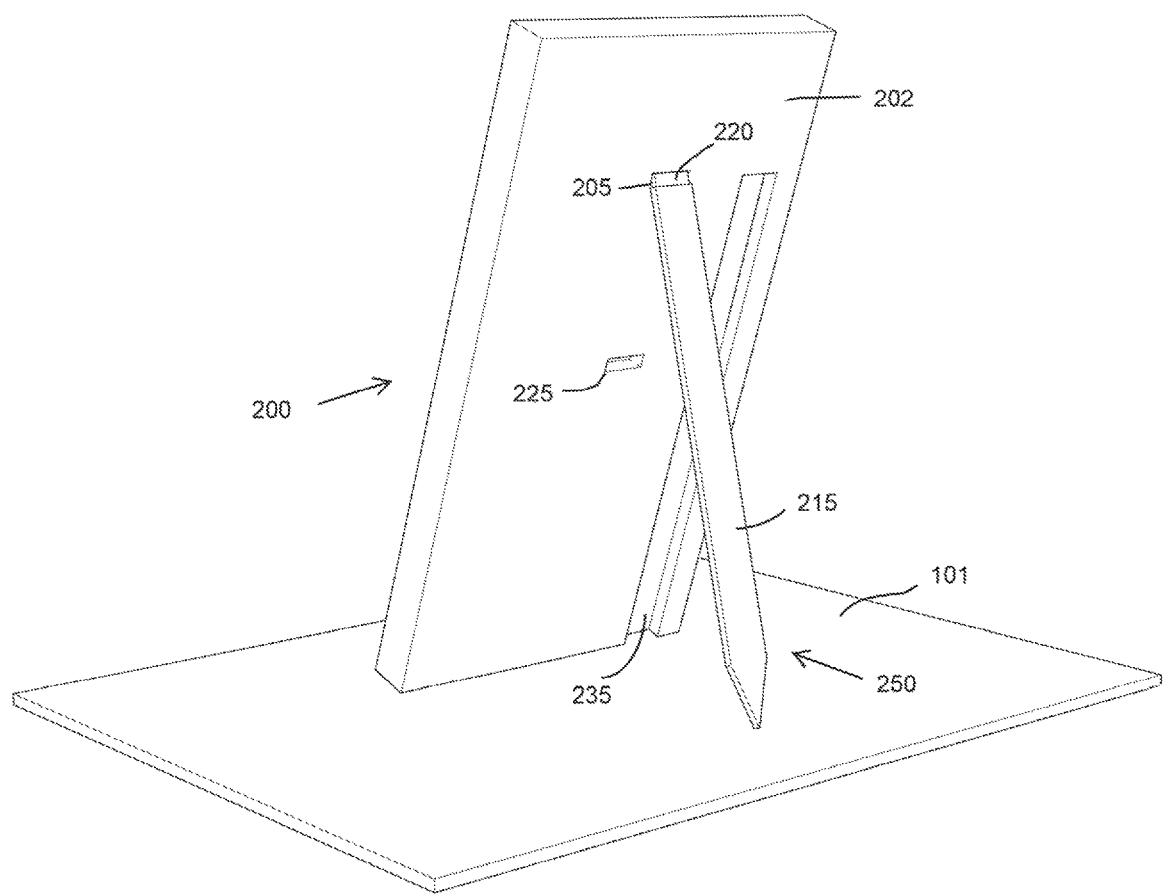
FIG. 11 illustrates a back perspective view of a stylus used to prop a personal information display and input device in the portrait orientation.

FIG. 11 illustrates a back-perspective view of the offset top 220 of flat stylus 250 inserted into top cavity 205 of the protective cover of personal information display and input device 200 in order to prop that device at a specific angular position in the portrait orientation.

Figure 12:
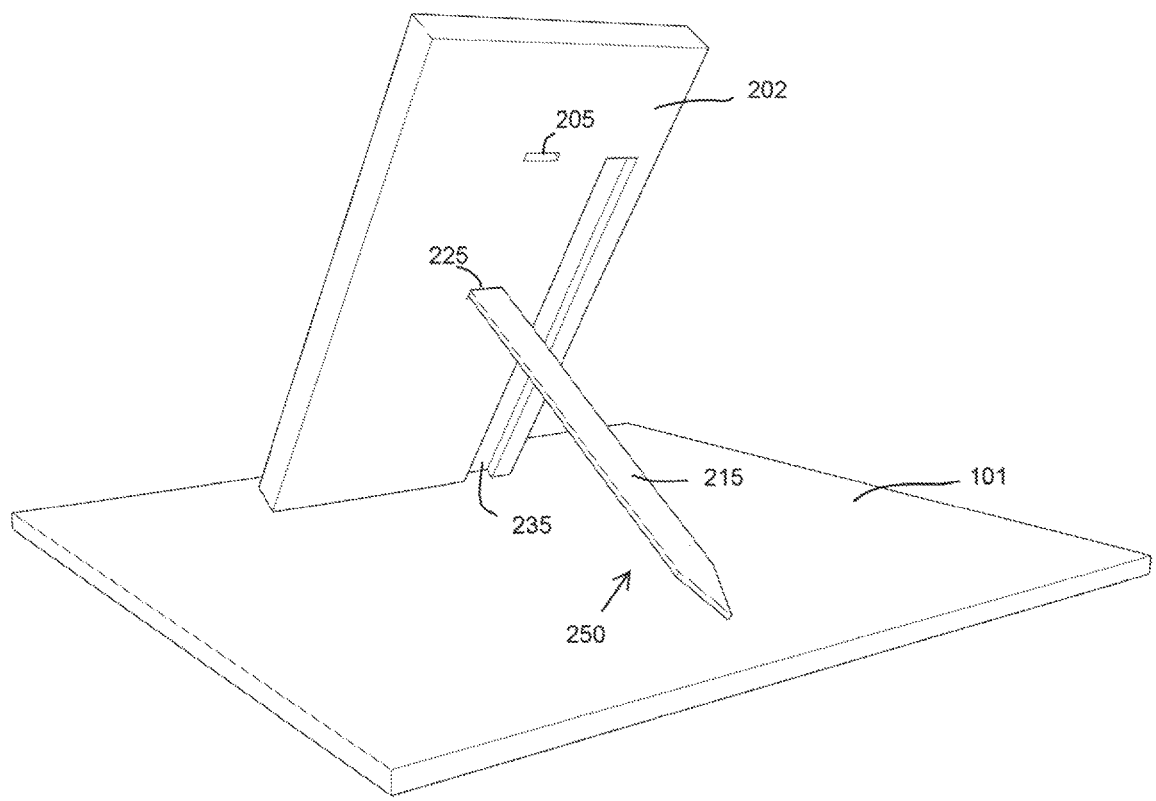
FIG. 12 illustrates a back perspective view of a stylus used to prop a personal information display and input device in an alternative portrait orientation using a different cavity in the back surface of the personal information display and input device enclosure.

FIG. 12 illustrates a back perspective view of the offset top 220 of flat stylus 250 fully inserted into bottom cavity 225 of the protective cover of personal information display and input device 200 in order prop that device at a more inclined angular position in the portrait orientation.

Figure 13:
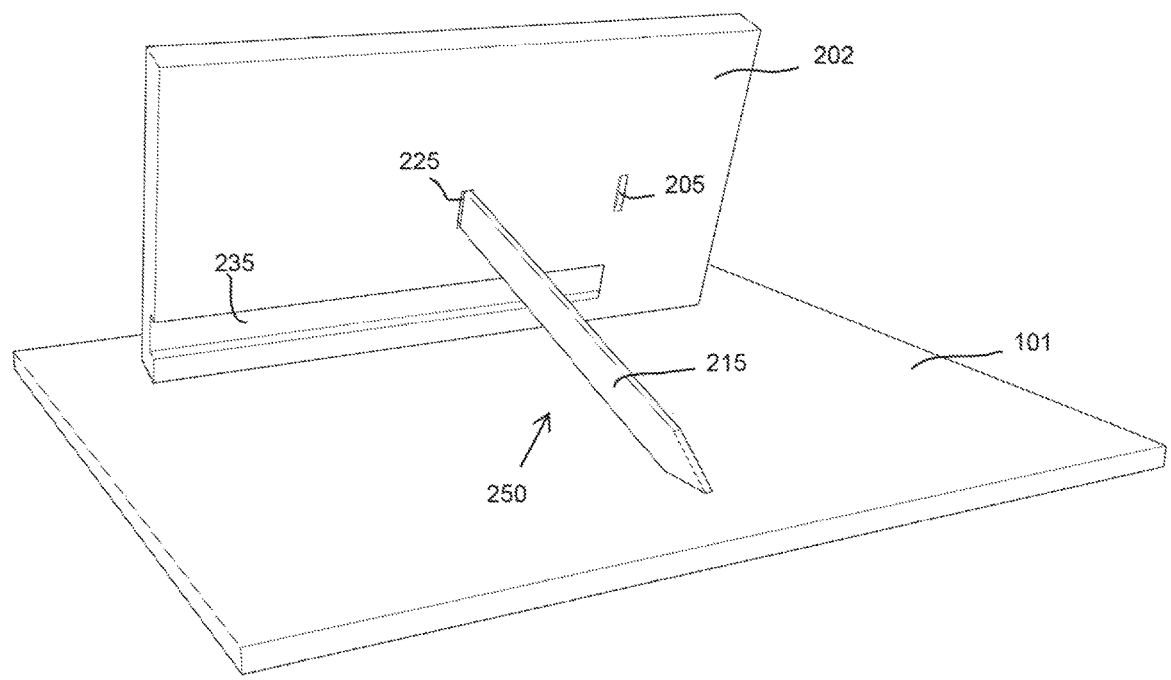
FIG. 13 illustrates a back perspective view of a stylus used to prop a personal information display and input device in a landscape orientation using the same cavity used in FIG. 12 to prop the personal information display and input device in an alternative portrait orientation.

FIG. 13 illustrates a back perspective view of the offset top 220 of flat stylus 250 fully inserted into bottom cavity 225 of the protective cover of personal information display and input device 200 in order prop that device in a landscape orientation using the same cavity used in FIG. 12 to prop the same device in an alternative portrait orientation.

Figure 14:
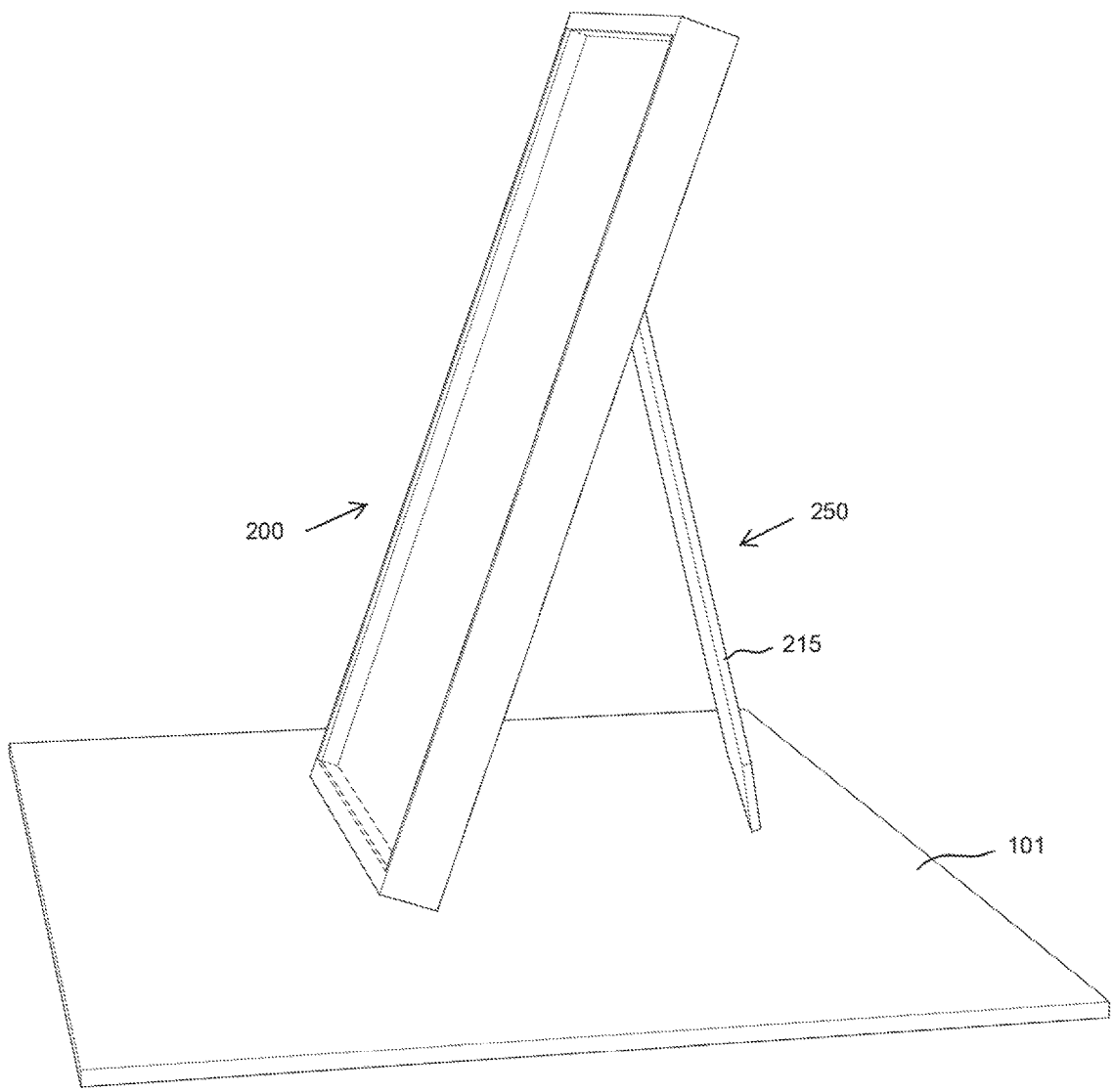
FIG. 14 illustrates a three dimensional perspective side view of a personal information display and input device being propped by a flat shaped stylus in the portrait orientation.

FIG. 14 illustrates a three dimensional perspective side view of the offset top 220 of flat stylus 250 inserted into top cavity 205 of the protective cover of personal information display and input device 200 in order prop that device at a specific angular position in the portrait orientation.

Figure 15:
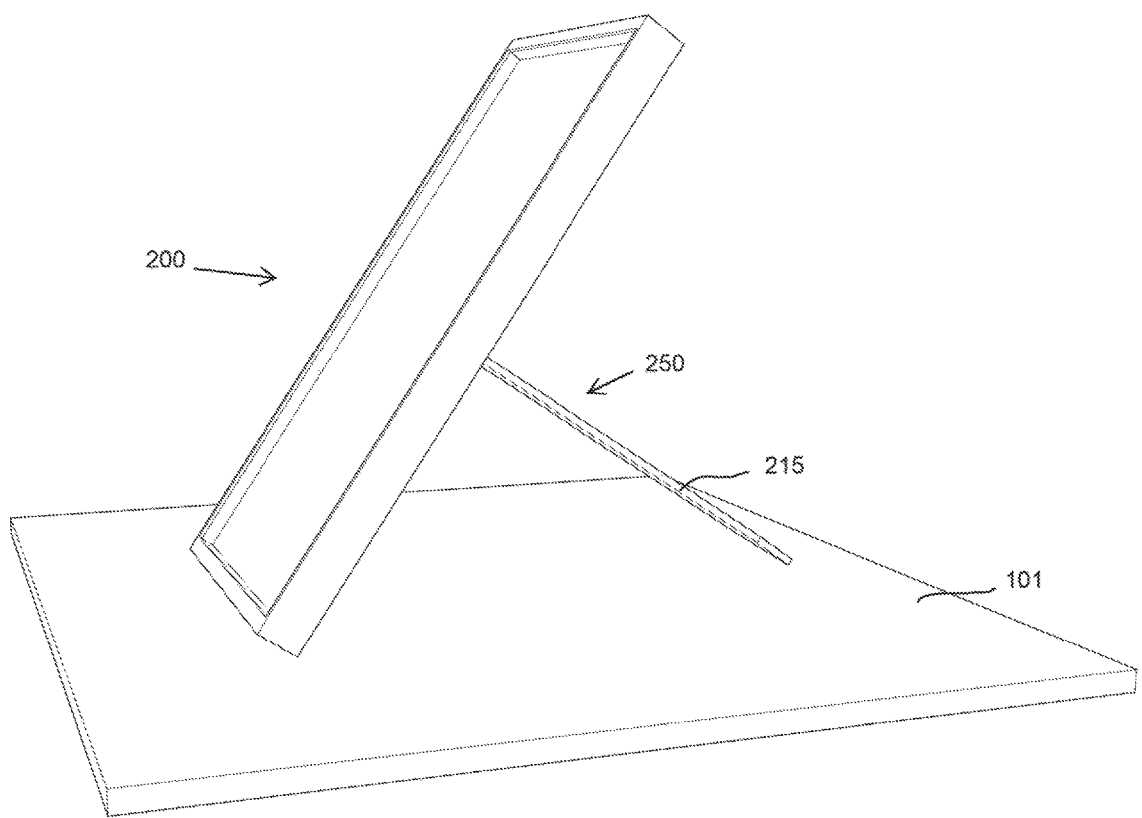
FIG. 15 illustrates a three dimensional perspective side view of a personal information display and input device being propped by a flat shaped stylus in the portrait orientation at an alternative angular position.

FIG. 15 illustrates a three dimensional perspective side view of the offset top 220 of flat stylus 250 fully inserted into bottom cavity 225 of the protective cover of personal information display and input device 200 in order prop that device at a more inclined angular position in the portrait orientation.

Figure 16:
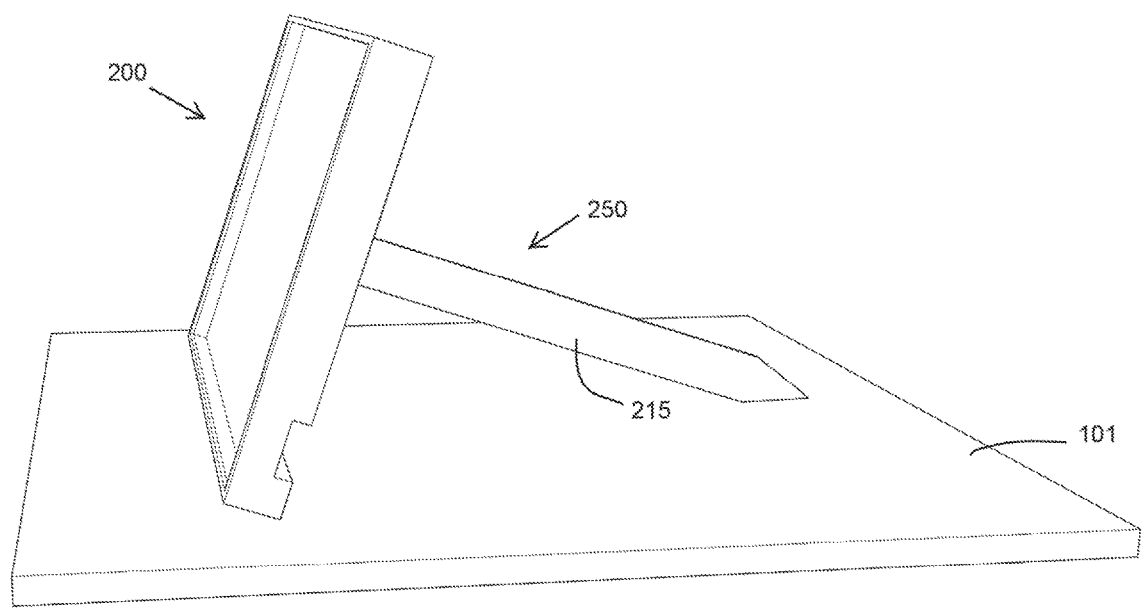
FIG. 16 illustrates a three dimensional perspective side view of a personal information display and input device being propped by a flat shaped stylus in the landscape orientation.

FIG. 16 illustrates a three dimensional perspective side view of the offset top 220 of flat stylus 250 fully inserted into bottom cavity 225 of the protective cover of personal information display and input device 200 in order prop that device in a landscape orientation using the same cavity used in FIG. 15 to prop the same device in an alternative portrait orientation.

Figure 17:
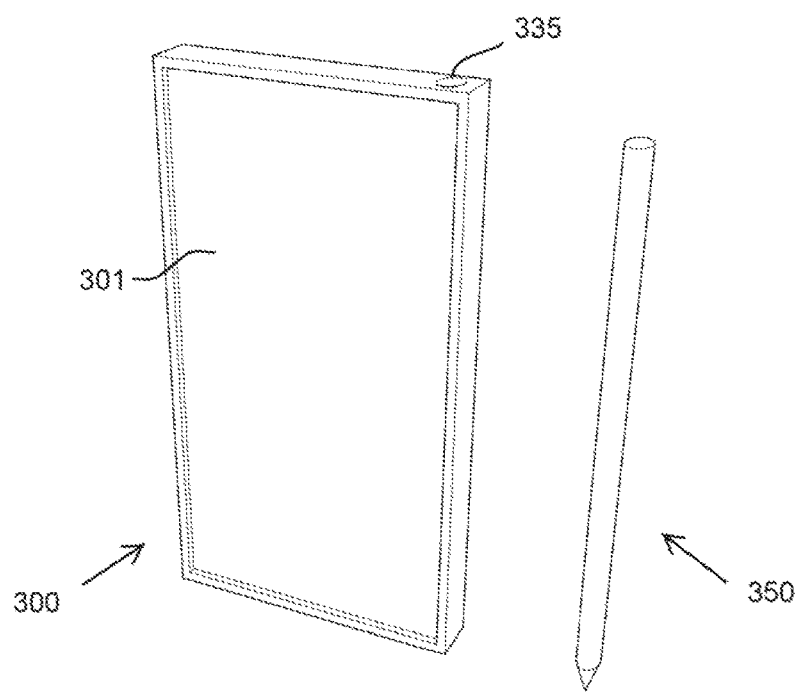
FIG. 17 illustrates a front view of an embodiment of a personal information display and input device with an associated cylindrical stylus.

FIG. 17 illustrates a front view of an embodiment of a protective cover for a personal information display and input device 300 containing a pen silo 335 with an associated cylindrical stylus 350.

Figure 18:
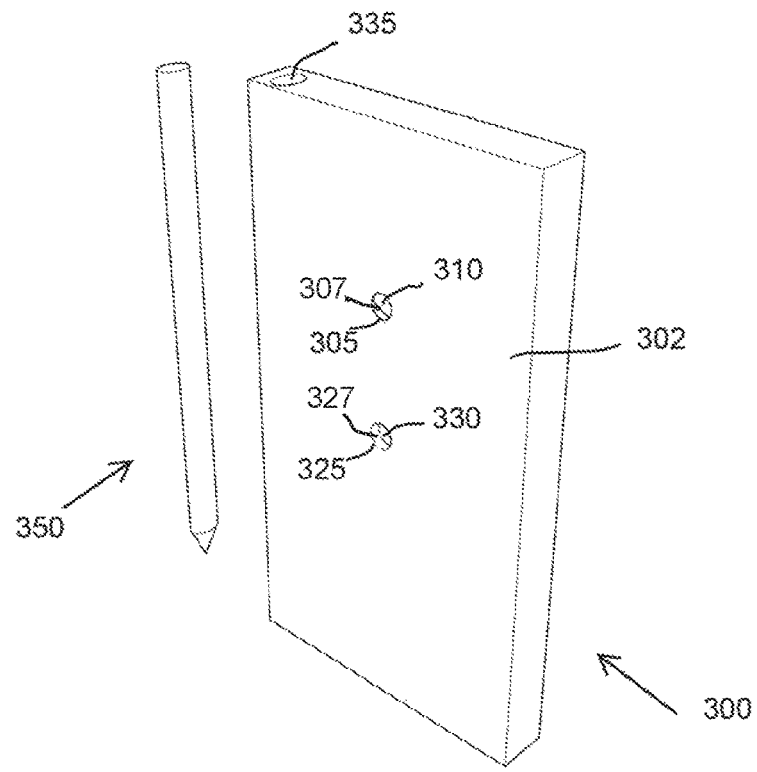
FIG. 18 illustrates a back view of an embodiment of a personal information display and input device with round cavities carved on the back surface of the personal information display and input device; cavities which are shaped to receive an end of a cylindrical stylus at varying angles.

FIG. 18 illustrates a 3D back view of a non-limiting embodiment of an enveloping protective cover for a personal information display and input device 300 that includes a pen silo, with the back side of its back panel 302 exposed, along with an associated cylindrically shaped stylus 350. The back side of the back panel 302 includes cavity 305 with a slanted curved wall 307 and a slanted straight wall 310 located in the top tier of protective cover 300 and a second cavity 325 with a curved side wall 327 and a straight back wall 330 located in the middle of protective cover 300.

Figure 19:
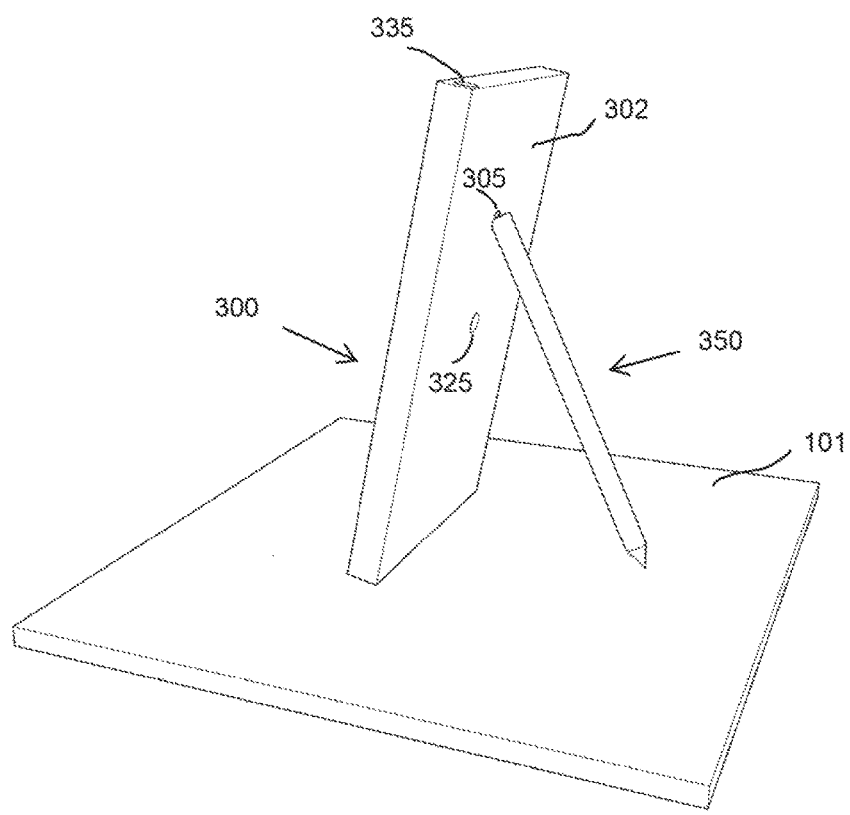
FIG. 19 illustrates a three dimensional perspective side view of a personal information display and input device being propped by a cylindrically shaped stylus in the portrait orientation.

FIG. 19 illustrates a three-dimensional side perspective view of cylindrically shaped stylus 350 inserted into top cavity 305 of the protective cover of personal information display and input device 300 in order prop that device to a specific angular position in the portrait orientation.

Figure 20:
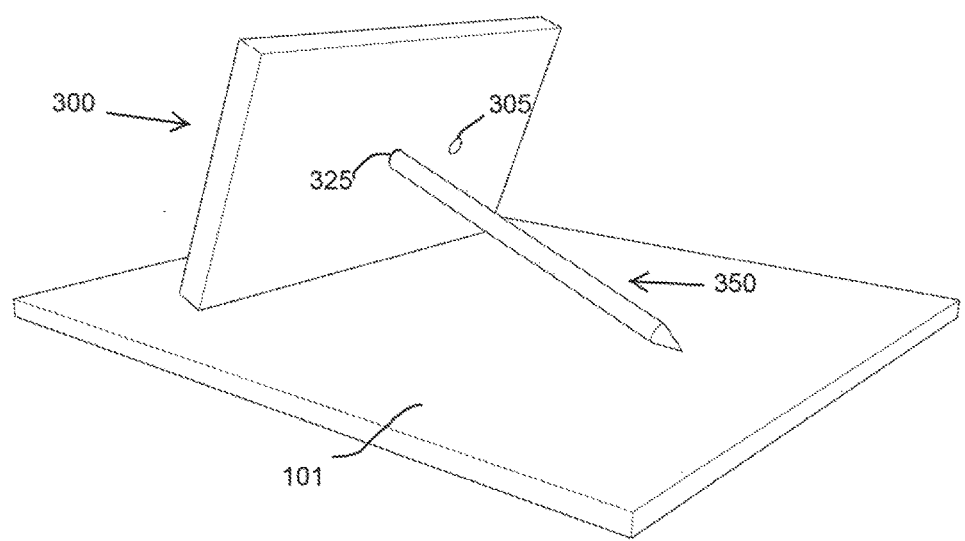
FIG. 20 illustrates a three dimensional perspective side view of a personal information display and input device being propped by a cylindrically shaped stylus in the landscape orientation.

FIG. 20 illustrates a three dimensional back perspective of a personal information display and input device 300 being propped by a cylindrically shaped stylus 350 in the landscape orientation.

While at least one exemplary embodiment of the present invention is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The claimed invention is:

1. A support mechanism for using a support element, such as a stylus, an independent arm, or plate, to prop and position an electronic information display and input device to various angles and orientations with respect to a resting surface or base; the support mechanism comprising:

a back plate of an electronic information display and input device; or a protective cover of an electronic information display and input device; or a panel that can be adhered to the back plate of an electronic information display and input device;

wherein the back plate, protective cover, or panel, comprises at least two cavities, sockets, or notches, each cavity, socket, or notch comprising straight, or slanted walls, or a combination of both; with each cavity, socket, or notch configured to receive, fully or partially, one end of a matching support element; such as a stylus, an independent arm, or plate at a specific angle and orientation with respect to the back plate, protective cover, or panel; and wherein the support element is used to prop the electronic information display and input device to discrete angles and orientations with respect to a resting surface or base by manually keying one end of the support element into a matching cavity, socket, or notch located in the back plate, protective cover, or panel, and placing the other end of the support element on a resting surface or base; wherein the electronic information display and input device comprises a cavity or slot for storing the support element.

2. The system of claim 1 wherein at least one end of the support element is magnetized and the matching cavities, sockets, or notches on the back plate, protective cover, or panel comprise, or are layered by, a metallic substance.

3. The system of claim 1 wherein at least one end of the support element is metallic and the matching cavities, sockets, or notches on the back plate, protective cover, or panel comprise, or are layered by, a magnetic substance.

\* \* \* \* \*